(12) United States Patent
De'Longhi et al.

(10) Patent No.: US 10,905,284 B2
(45) Date of Patent: Feb. 2, 2021

(54) APPARATUS FOR COOKING FOOD

(71) Applicant: De'Longhi Appliances S.r.l. con Unico Socio, Treviso (IT)

(72) Inventors: Giuseppe De'Longhi, Treviso (IT); Gianpaolo Trevisan, San Martino Buon Albergo (IT); Renzo Mazzon, Silea (IT)

(73) Assignee: DE'LONGHI APPLIANCES S.R.L. CON UNICO SOCIO, Treviso (IT)

( * ) Notice: Subject to any disclaimer, the term of this patent is extended or adjusted under 35 U.S.C. 154(b) by 181 days.

(21) Appl. No.: 15/776,983

(22) PCT Filed: Nov. 18, 2016

(86) PCT No.: PCT/IB2016/056954
§ 371 (c)(1),
(2) Date: May 17, 2018

(87) PCT Pub. No.: WO2017/085676
PCT Pub. Date: May 26, 2017

(65) Prior Publication Data
US 2018/0325318 A1      Nov. 15, 2018

(30) Foreign Application Priority Data

Nov. 19, 2015   (IT) .................. 102015000074511

(51) Int. Cl.
*H05B 1/02*   (2006.01)
*A47J 37/12*   (2006.01)
(Continued)

(52) U.S. Cl.
CPC ....... *A47J 37/1266* (2013.01); *A47J 37/0641* (2013.01); *A47J 37/1261* (2013.01); *A47J 43/046* (2013.01); *F24C 15/322* (2013.01)

(58) Field of Classification Search
CPC .. A47J 37/1266; A47J 37/0641; A47J 43/047; F24C 15/22; H05B 1/02; H05B 1/0267; H05B 3/0076; H05B 6/6464
(Continued)

(56) References Cited

U.S. PATENT DOCUMENTS 4,476,946 A * 10/1984 Smith .................... G01G 19/52
                                                        177/144
5,590,583 A    1/1997 Harrison
2014/0008133 A1 * 1/2014 Chan ........................ G01G 3/14
                                                        177/180

FOREIGN PATENT DOCUMENTS

DE   102008027353 A1   12/2009
GB        2434740 A     8/2007
WO    2012030826 A1     3/2012

OTHER PUBLICATIONS

Int'l Search Report and Written Opinion, dated Feb. 28, 2017 in Int'l Application No. PCT/IB2016/056954.

* cited by examiner

*Primary Examiner* — Mark H Paschall
(74) *Attorney, Agent, or Firm* — Panitch Schwarze Belisario & Nadel LLP

(57) ABSTRACT

An apparatus for cooking food (10) includes a casing (14), a lid (20) and at least a support unit (11). The casing (14) has a compartment in which to insert a container (12) which may be temporally associated with the support unit (11), and the support unit (11) may be configured to temporally support the container (12) with respect to a support plane. The apparatus for cooking food (10) also includes a first heating unit (16a), a second heating unit (16b), a third heating unit (16c) and a weighing unit (18) associated with a control unit (36).

12 Claims, 2 Drawing Sheets

(51) Int. Cl.
*A47J 37/06* (2006.01)
*A47J 43/046* (2006.01)
*F24C 15/32* (2006.01)

(58) Field of Classification Search
USPC .......................................... 219/494, 708, 518
See application file for complete search history.

APPARATUS FOR COOKING FOOD

CROSS-REFERENCE TO RELATED APPLICATIONS

This application is a Section 371 of International Application No. PCT/IB2016/056954, filed Nov. 18, 2016, which was published in the English language on May 26, 2017, under International Publication No. WO 2017/085676 A1, which claims priority under 35 U.S.C. § 119(b) to Italian Application No. 102015000074511, filed Nov. 19, 2015, the disclosures of which are incorporated herein by reference in its/their entirety.

FIELD OF THE INVENTION

The present invention concerns an apparatus for cooking food, by way of example, but not exclusively, for cooking food using electric cooking devices.

The invention is applied, although not exclusively, in the field of autonomous cooking devices such as dry or immersion fryers, or analogous or similar devices.

In particular, the present invention concerns an autonomous apparatus for cooking food that also comprises a unit for weighing the food.

BACKGROUND OF THE INVENTION

The marketing and sale is known, of autonomous apparatuses having a heating unit, for example of the electric type, to heat and/or cook foods, said heating unit comprising heating elements configured to take the food to the desired temperature.

Usually, known cooking apparatuses for food can be associated with a container, inside which the food to be heated and/or cooked is disposed. The container can contain a temperature mediator such as water, oil or other suitable mean.

One type of apparatus for cooking food is known intended for use as fryers or suchlike, which also comprise a lid with which heating elements and ventilation means driven by a drive member are associated.

Furthermore, said apparatuses for cooking food can also comprise mixing elements, or other tools such as blades, shredders or suchlike, which collaborate with the container, and are selectively drivable by a drive member which allows to mix the food or to reduce it to small pieces.

Usually, known apparatuses for cooking food comprise a casing configured to support the container, to protect the sensitive elements and the parts which, as they heat up, could damage the users.

Known casings also comprise a bottom to support the whole apparatus and to arrange it on a support plane.

A multifunction kitchen apparatus is known, which has a weighing unit that is located between the bottom and the container and that interacts with the container, so as to allow to weigh the food.

The weighing unit supports the weight of the container, and what it contains, by means of an elastic system that cooperates with a bridge system, the whole thing being structured to damp the vibrations and allow in any case to make measurements, at the same time preserving the measuring unit as much as possible.

Due to the structure of the weighing unit, it has a level of precision that is often unsatisfactory.

In addition, the structure of the drive member is sensitive to heat and does not allow either compensations or mediations.

Moreover, the drive member is also sensitive to the leveling of the base so that the uncertainty of the measurement also depends on the support plane being horizontal.

Another disadvantage is that the system comprises elastic functions that are affected both by ageing and by hysteresis.

Another problem is that rather long times are required, between one measurement and the next, so that the hysteresis can be cancelled.

It is also known that certain dishes or recipes require precise measurements, possibly obtained in short times, of the individual components.

Furthermore, it is known that during the preparation and/or cooking steps it is necessary to intervene with progressive additions or top-ups of substances already present in the container, or precise quantities of new substances.

Moreover, state of the art experience cannot be applied where the container of the food to be cooked has a flat or substantially flat base of considerable size.

Nor can it be used where the apparatus for cooking food has to have limited height because of easy and very probable overbalancing.

WO-A-2012/030826 describes an apparatus for cooking food comprising an external body or casing and a lid. The external body has a compartment to house the container inside it and comprises a weighing unit. The weighing unit comprises two support members flexible under the weight of the external body of the container and the food contained inside the latter.

Furthermore, the two support members are attached constrainedly to a bottom, which acts as the base of the apparatus, using two steel plates disposed respectively above and below the support member. The support member is attached to the bottom by attachment elements.

In this way the weighing unit is constrained to the bottom of the apparatus, which is a rigid, non-flexible element, and it is not able to compensate for the support plane possibly not being horizontal.

Moreover, since it is influenced by the weight of the external body, as well as the container and the food, the weighing unit is not able to detect the weight of small quantities of food.

Document DE-A-102008027353 describes an apparatus provided with a weighing unit having three sensors to detect the weight, connected to support feet and disposed in a triangle.

All this makes it necessary to have available an apparatus for cooking food that is able to detect continuously the weight of the food, with constancy, speed, and precision, also and especially in non-theoretical conditions.

There is therefore a need to perfect an apparatus for cooking food that can overcome at least one of the disadvantages of the state of the art.

In particular, one purpose of the present invention is to obtain an apparatus for cooking food that allows to weigh, on each occasion, the individual components accurately and precisely, also with quick cadences and for minimum values, and also in non-ideal conditions.

Another purpose is to obtain an apparatus for cooking food able to weigh, on each occasion, the individual foods, in non-planar or non-regular conditions of the support plane on which it is disposed.

Another purpose of the present invention is to obtain an apparatus for cooking food equipped with a weighing unit able to detect the weight of the individual ingredients and, on each occasion, of the food, accurately and precisely, even if subjected to vibrations and also during the heating and/or cooking steps.

Another purpose of the present invention is to perfect an apparatus for cooking food with a weighing unit able to weigh the food carefully and precisely even if it is not uniformly distributed inside the container.

Moreover, another purpose of the present invention is to obtain an apparatus for cooking food that is compact, with sizes as limited as possible and hence not bulky.

Another purpose of the present invention is to obtain an apparatus for cooking food that is safe and reliable.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, an apparatus for cooking food is provided comprising a casing, defined by a body and by a bottom, a lid with at least two positions, respectively open and closed, and a support unit with which a removable container is at least temporarily associated by means of a suitable connection element.

The casing defines the external structure of the apparatus for cooking food and is configured to protect the internal components, being at least partly cooperating, directly or indirectly, with the support unit.

According to the invention, the support unit comprises at least a weighing unit, which has at least a weight detection device, advantageously at least two weight detection devices, independent from each other, in order to guarantee the detection of the weight of the food in a rapid, precise, averaged and balanced manner.

The provision of at least two weight detection devices, by their conformation, allows to detect the correct value whatever the position and/or distribution of the food in the container.

The disposition of the weight detection devices allows the accurate and precise detection of the weight, even if the containers are not balanced or if the container is substituted.

The weight detection devices are connected to processor means suitable to supply the information about the weight, both in terms of accurate measurement and in terms of average and progressive measurement, and possibly to intervene in the functions of the apparatus in the event that a precise recipe is introduced into it.

In accordance with another aspect of the present invention, the weighing unit associates the container directly with the support plane, the weighing function being independent from other factors inherent in the apparatus.

The support unit comprises at least a connection plate of the container to the weighing unit, which divides the weight and is associated with at least a support element disposed below it, in the position of use of the cooking apparatus. The support element is configured to directly connect the connection plate to each weight detection device in correspondence to an intermediate point of distribution arms, disposed parallel to the connection plate; the distribution arms connect two adjacent feet to each other, which serve as support elements of the whole cooking apparatus to a plane or other surface. The distribution arms are connected to the feet independently from the bottom of the casing.

Moreover, due to the presence of at least two weight detection devices cooperating directly with the support plane and the container, and due to the position of the two weight detection devices with respect to the container, the solution according to the invention is able to precisely detect the weight, or the variation in weight, in the event of a dynamic modification of the weights and/or the increase/decrease of the weights.

The data detected can be processed, thus drastically reducing the measuring error, both in situations of non-uniform distribution of the load and also in non-planar or irregular conditions of the support plane.

Every weight detection device has respective support feet and cooperates with at least one load cell, said feet being balanced with respect to the container.

The present invention therefore allows the correct and accurate measurement of the weight in any condition whatsoever, both static and operative.

According to variant embodiments of the present invention, the support unit can comprise means for heating the container and/or means that make a possible tool in the container rotate, and/or means to detect the temperature in the container and/or control and command means, all of them being correctly coordinated by data processing means.

Another variant provides that the lid has ventilation means to circulate the air and/or steam inside the container and/or auxiliary heating means and/or air exchange means and/or cooling means to cool the drive member of the ventilation means and/or means to detect the temperature inside the container.

It comes within the spirit of the invention to provide that the apparatus has a control and data input console that cooperates with a management and command group, such as a control unit.

It also comes within the spirit of the invention that the container has handles integrated with it, or assemblable and/or mobile.

According to another variant, the container has handles that are situated outside the apparatus for cooking food and that cooperate with the lid and/or the protective casing, for the purposes of an airtight seal.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
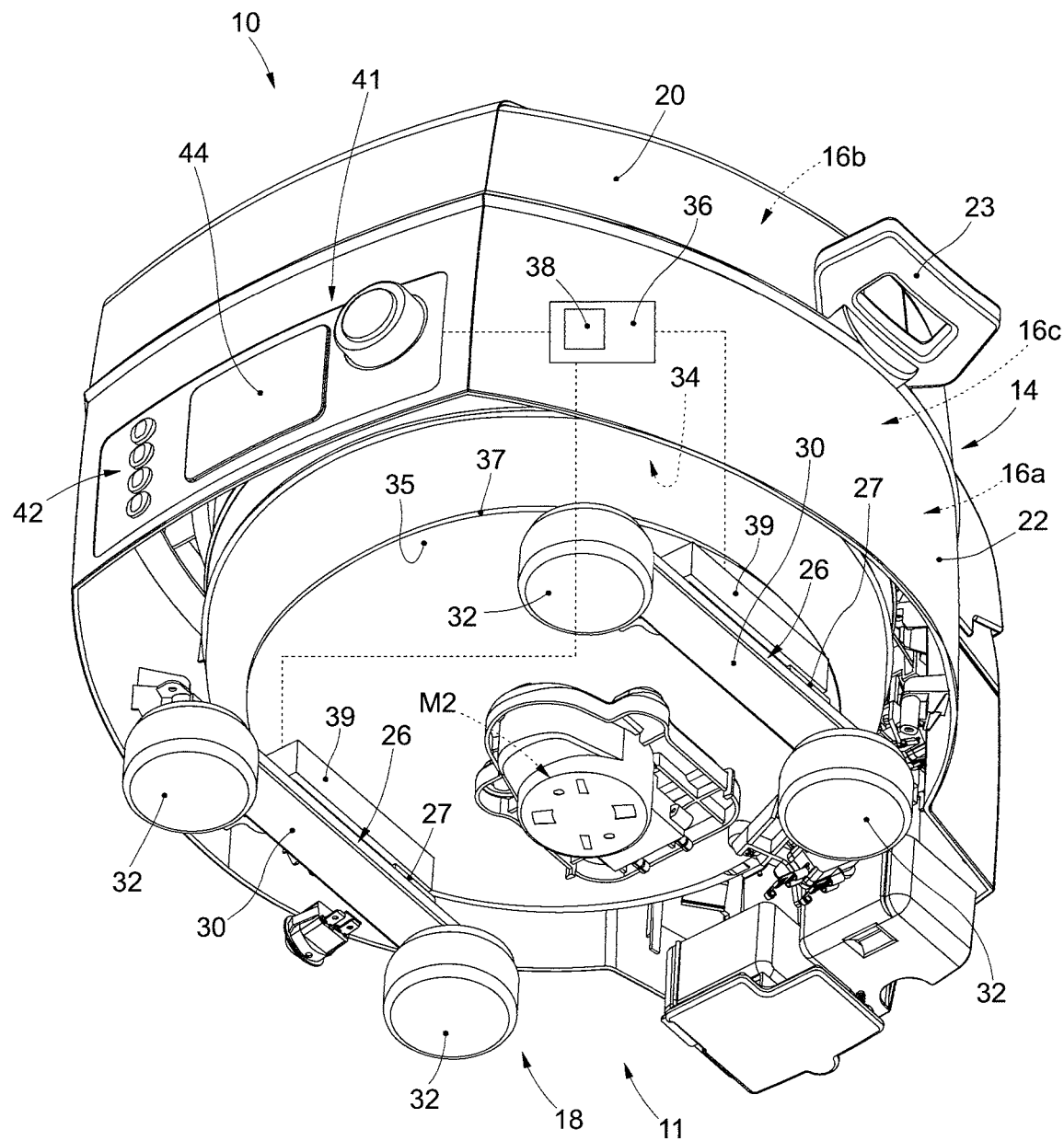
FIG. 1 is a perspective view from below of an apparatus for cooking food in accordance with embodiments described here (without the bottom for a clearer analysis of the weighing unit)

With reference to the attached drawings, they are used to describe example embodiments of an apparatus for cooking food 10 comprising heating means 16*a*, 16*b*, 16*c*.

The apparatus for cooking food 10 can be a fryer, by way of example a fryer suitable for cooking using a low quantity of temperature mediator.

The apparatus for cooking food 10 comprises a casing 14 defining its external structure, suitable to protect the internal components of the apparatus 10, a lid 20 and a support unit 11.

The casing 14 comprises at least a body 22 which mainly defines it externally and functions as a covering.

The body 22 cooperates with a bottom 24 with which it can be integral or integrated, even only temporarily.

According to the present invention, the support unit 11 comprises at least a weighing unit 18, at least a connection plate 35 and is associated with a first heating unit 16a. At least one container 12, configured to contain food, is selectively associable, at least temporarily, on said connection plate 35.

It comes within the spirit of the invention that the connection plate 35 can be replaced by or integrated with another analogous or similar element with the same function.

The container 12 is defined by a base 12a and by lateral walls 12b that can have one or more handles 23, either fixed or folding.

The connection plate 35 is configured to connect the container 12 to the weighing unit 18.

The connection plate 35 is associated at the bottom to at least one support element 39 disposed on the opposite surface with respect to the surface that is associated with the container 12.

Figure 2:
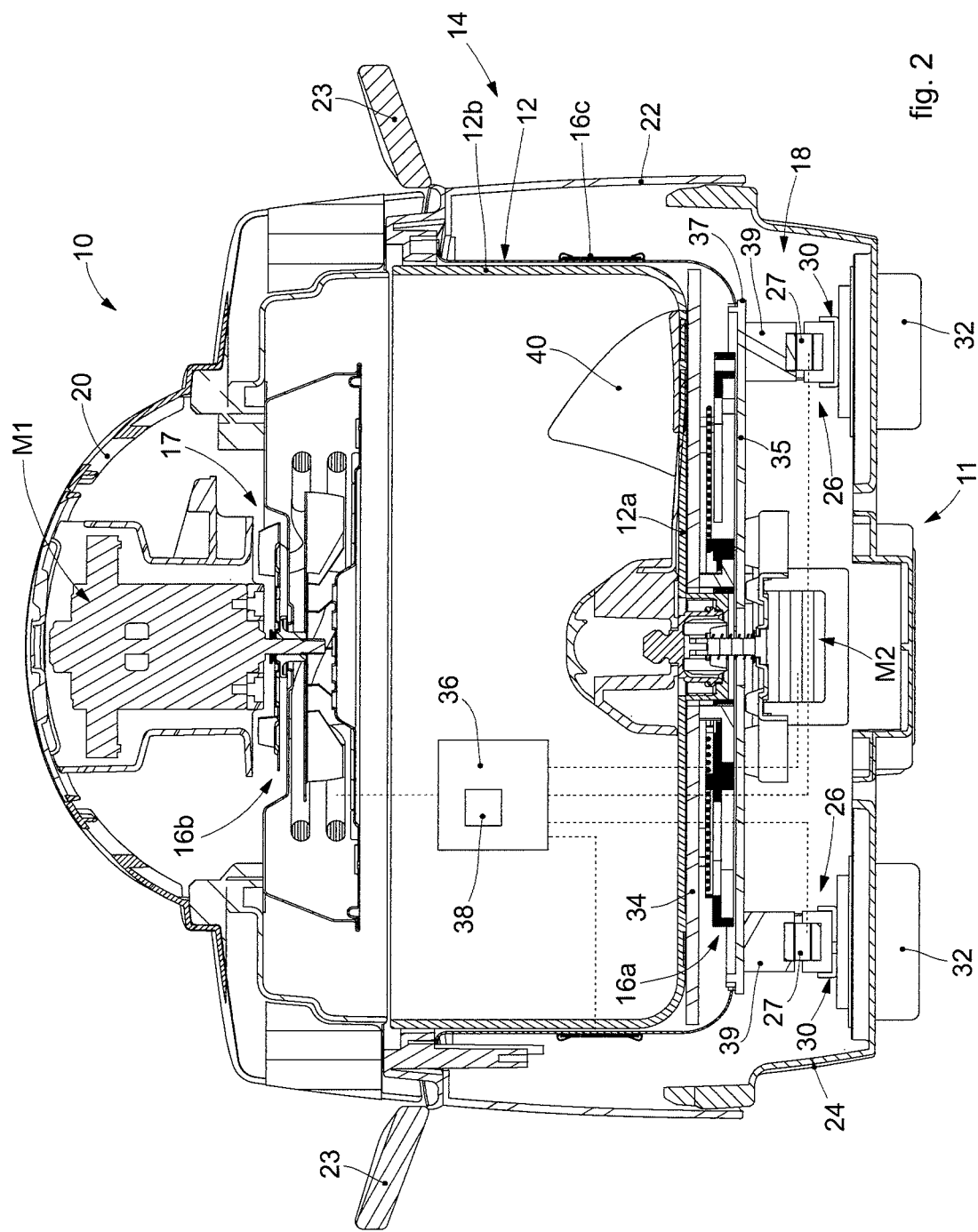
FIG. 2 is a cross section of an apparatus for cooking food in accordance with other embodiments described here.

According to one embodiment shown by way of example in FIGS. 1 and 2, there are two support elements 39, disposed substantially in correspondence with a peripheral edge 37 of the connection plate 35, on substantially opposite sides of said peripheral edge 37 and symmetrically to each other with respect to a median axis of the connection plate 35.

Furthermore, the connection plate 35 can be configured to support a possible drive member M2 suitable to drive a possible tool 40, selectively removable and associable with the container 12.

The tool 40 can be the type suitable to mix the food, such as a beater, or the type suitable to shred/mince the food contained in the container 12, such as a blade, a shredder or similar or comparable elements.

The drive member M2 can make the tool 40 rotate at different speeds and/or in different directions, depending on the effect desired on the food.

The first heating unit 16a, comprising heating elements, can be associated with the connection plate 35.

The heating elements can be the electric type such as, by way of example, electric resistances, such as tubular electric resistances, or resistive bands or wires, able to generate heat to be conveyed to the container 12.

Moreover, the heating elements can be the inductive type, such as halogen, infrared, or similar or comparable elements, or can be heating planes made of metal material, such as for example aluminum or other.

At least most of the weighing unit 18 is disposed in the lower part of the apparatus for cooking food 10, and immediately below the container 12, so as to lower the center of gravity of the whole structure and to minimize instability and vibrations.

The weighing unit 18 is able to detect and/or make visible the calibration of the at least one container 12, indicating to the operator the precise and exact weight of the individual components of the food, or the total progressive weight.

According to the present invention, the weighing unit 18 comprises at least two weight detection devices 26 disposed on opposite sides in substantial correspondence with the peripheral edge 37 of the connection plate 35.

The weight detection devices 26 allow to connect stably and directly the at least one container 12 to a support plane on which the apparatus for cooking food 10 is disposed.

According to possible variant embodiments, the at least one weight detection device 26 comprises at least one sensor element 27.

The at least one sensor element 27 can be one selected from the group comprising:

force sensors or transducers, such as load cells, for example load cells with a strain gauge, piezoelectric load cells, vibrating wire load cells and capacitive load cells or other;

pressure sensors or transducers, for example of the electronic type generally used to collect a force to measure deformation or shift caused by the force applied above an area, such as sensors with a piezo-resistive strain gauge, capacitive sensors, electromagnetic sensors, piezoelectric sensors, optical sensors or potentiometric sensors or others.

The weight detection devices 26 are associated with the connection plate 35 and cooperate with each other thanks to the connection plate 35.

In particular, the support elements 39 obtain a direct connection between the weight detection devices 26 and the connection plate 35.

The connection plate 35 is configured to distribute in a coordinated and uniform manner the weight of the food, inserted on each occasion into the at least one container 12, on the at least one weight detection device 26.

The connection plate 35 can have a surface with a rounded or square shape, for example it can have a surface sufficient to allow association with the container 12 and/or the first heating unit 16a.

According to the present invention, each weight detection device 26 comprises distribution arms 30, each of which connects two corresponding feet 32 distanced from each other to guarantee stability, said feet 32 being positioned at the tops of a quadrilateral.

The distribution arms 30 are exclusively connected to the equivalent feet 32 independently from the bottom 24 of the casing 14.

The distribution arms 30 are connected to the connection plate 35 by means of at least one support element 39 in correspondence with an intermediate point thereof, advantageously substantially median.

In this way, advantageously, the weighing unit can compensate for the support plane possibly not being horizontal, as it is not constrained rigidly to the bottom 24.

According to one embodiment shown by way of example in FIGS. 1 and 2, the support elements 39 have an oblong development and their contact surface with the distribution arms 30 is smaller than the length of the corresponding distribution arm 30.

According to embodiments described here, the distribution arms 30 are positioned substantially parallel to each other and in substantial correspondence with opposite portions of the peripheral edge 37 of the connection plate 35.

The feet 32 are provided to extend the support surface of the apparatus for cooking food 10.

According to variant embodiments, the feet 32 can be mobile with respect to the distribution arms 30, for example they are equipped with a joint, so as to allow to improve the adaptation of the feet 32 to the support plane, further stabilizing the apparatus for cooking food 10.

According to variant embodiments, the distribution aims 30 can be configured to connect at least pairs of feet 32, to distribute the weight force and adapt it, on each occasion, according to the location of the apparatus for cooking food 10 and the distribution of the food in the container 12.

According to some embodiments, two feet 32 are connected to the corresponding distribution arm 30 in correspondence with its ends.

According to variant embodiments, the at least one sensor element 27 can be positioned between a corresponding distribution arm 30 and the connection plate 35 and/or between one foot 32 and a corresponding distribution arm 30 and/or in another position suitable to detect the weight.

According to variant embodiments, above the connection plate 35 a support element 34 can be provided, for the selective support of the container 12.

The support element 34 can be made of materials transparent to electromagnetic radiation, such as for example glass or plastic etc.

Depending on the type of heating element, the first heating unit 16a can cooperate with the support element 34 to transmit heat to the container 12.

Alternatively, the support element 34 may also not be provided and the container 12 can come into direct contact with the heating elements of the first heating unit 16a.

The first heating unit 16a is configured to take the at least one container 12, and consequently the food contained therein, to a desired temperature in order to heat and/or cook it.

According to variant embodiments, the apparatus for cooking food 10 can also comprise a second heating unit 16b, disposed in the lid 20, in the upper part of the apparatus for cooking food 10.

According to other variant embodiments, the lid 20, possibly in cooperation with the second heating unit 16b, has ventilation means 17 equipped with a drive member M1, configured to convey the heat generated and/or to circulate the air and/or steam inside the at least one container 12, promoting heat exchange with the food.

According to variant embodiments described using FIG. 2, a third heating unit 16c can be provided, to collaborate laterally with the container 12, heating the lateral walls 12b.

The weighing unit 18 of the apparatus for cooking food 10 can comprise at least a control unit 36 to collaborate in the weighing functions, which can also cooperate with the first heating unit 16a and/or the second heating unit 16b and/or the third heating unit 16c.

The control unit 36 can be associated at least with the weight detection devices 26 to acquire data detected by the latter and so as to process them.

Furthermore, the control unit 36 can be associated with every element or function present in the apparatus 10 and operate according to a general or desired program.

According to variant embodiments, the control unit 36 can be configured to set possible corrections to errors in the value of weight detected by the weight detection devices 26.

The control unit 36 can comprise a memory 38, of a known type, to memorize and store weight data flows detected by the weighing unit 18 and also function as a control if the total weight of the food exceeds a determinate expected or desired value.

The memory 38 can also be implemented with recipes and, by means of the control unit 36, can intervene in obtaining the desired food.

According to variant embodiments, the memory 38 can also be configured to memorize temperature data or also lifespan of the first heating unit 16a and/or the second heating unit 16b and/or the third heating unit 16c and/or the inside of the at least one container 12 and/or other zones of the apparatus for cooking food 10.

The control unit 36 can comprise a console 41 comprising at least a keypad 42 and advantageously also a display or screen 44.

The keypad 42 is configured at least to set the values of weight of the food to be introduced or already introduced into the at least one container 12.

Furthermore, the keypad 42 can allow to set the temperature to which the food is to be taken by means of the first heating unit 16a and/or the second heating unit 16b and/or the third heating unit 16c.

The screen 44 can be configured at least to display the value of the weighing measurements made by the weighing unit 18.

By way of example, the memory 38 can be configured to memorize a sequence of ingredients to be inserted into the at least one container 12, and the corresponding weights, so as to gradually suggest them on the screen 44 to an operator, in a known manner. The keypad 42 can be configured to insert or vary the values of weight of the food to be introduced into the at least one container 12 to correct, adapt, subdivide or multiply the recipes and/or insert and memorize, from new, sequences of ingredients and corresponding weights into the memory 38.

According to variant embodiments, the control unit 36 is able to recalculate the quantity, such as the weight and/or the number, of the ingredients needed to obtain a recipe, adapting them according to various factors such as for example the number of people the food is for or the total weight of the recipe, processing the weight of the other foods based on a chosen or reference food, etc.

The apparatus for cooking food 10 can be configured to be commanded by, or to dialog with, devices in remote mode.

According to variant embodiments, it is possible to activate/de-activate the apparatus for cooking food 10, and/or load recipes into the memory 38, by means of a remote device, such as a smartphone, palmtop, PC, portable or other device suitable for the purpose.

According to variant embodiments, it is possible to provide a software or application which puts the remote device in communication with the control unit 36 of the apparatus for cooking food 10.

By way of example, recipes can be loaded into the memory 38 and/or temperatures and/or cooking times can be set by means of wireless devices, such as Wi-Fi, Bluetooth or similar devices.

It is clear that modifications and/or additions of parts may be made to the apparatus for cooking food 10 as described heretofore, without departing from the field and scope of the present invention.

It is also clear that, although the present invention has been described with reference to some specific examples, a person of skill in the art shall certainly be able to achieve many other equivalent forms of apparatus for cooking food 10, having the characteristics as set forth in the claims and hence all coming within the field of protection defined thereby.

The invention claimed is:

1. An apparatus for cooking food, the apparatus comprising a casing (14), defined by a body (22) and by a bottom (24), a lid (20) and at least a support unit (11), the casing (14) having a compartment in which to insert a container (12) adapted to be temporally associated with and supported by the support unit (11) with respect to a support plane, the support unit (11) comprising a weighing unit (18), comprising at least one weight detection device (26) associated with a control unit (36), the weighing unit (18) associating the container (12) directly with the support plane, wherein the support unit (11) comprises at least a connection plate (35) connecting the container (12) to the weighing unit (18), the connection plate (35) having at least two support elements (39) disposed below it in the position of use of the cooking apparatus for engaging an opposite surface with respect to a surface that is associated to the container (12), the at least two support elements (39) connecting the connection plate (35) directly to the at least one weight detection device (26) in correspondence with an intermediate point of a corresponding distribution arm (30), the at least two support elements (39) being disposed substantially in correspondence with a respective portion of a peripheral edge (37) of the connection plate (35), on substantially opposite sides of the peripheral edge (37), and symmetrically to each other with respect to a median axis of the connection plate (35), two distribution arms (30) being present that connect adjacent feet (32) to each other, wherein the distribution arms (30) are connected exclusively to the feet (32) independently with respect to the bottom (24) of the casing (14), wherein the at least one weight detection device (26) comprises at least one sensor element (27) positioned between a corresponding distribution arm (30) and the connection plate (35) and/or between one foot (32) and a corresponding distribution arm (30).

2. The apparatus according to claim 1, wherein the feet (32) are connected to the corresponding distribution arm (30) in correspondence with its ends.

3. The apparatus according to claim 1, wherein the weighing unit (18) comprises two weight detection devices (26).

4. The apparatus according to claim 1, wherein the at least one weight detection device (26) comprises two feet (32), distanced from each other, the feet (32) in their entirety being disposed in a quadrilateral.

5. The apparatus according to claim 1, wherein the support unit (11) comprises a first heating unit (16a) disposed below the container (12).

6. The apparatus according to claim 1, further comprising a second heating unit (16b) in the lid (20).

7. The apparatus according to claim 1, wherein the lid (20) comprises ventilator (17).

8. The apparatus according to claim 1, wherein the connection plate (35) supports and positions a drive member (M2).

9. The apparatus according to claim 1, wherein the support unit (11) comprises at least one support element (34) for association with the container (12).

10. The apparatus according to claim 1, further comprising at least one console (41).

11. The apparatus according to claim 10, wherein the at least one console (41) comprises at least a keypad (42) and/or at least a screen (44).

12. The apparatus according to claim 1, wherein the control unit (36) comprises or cooperates with a memory (38) in which at least recipes and/or cooking instructions are memorized.

* * * * *